United States Patent
Ying et al.

(10) Patent No.: US 8,930,360 B2
(45) Date of Patent: Jan. 6, 2015

(54) SYSTEM AND METHOD FOR ONLINE HANDWRITING RECOGNITION IN WEB QUERIES

(75) Inventors: Jian-Jung Ying, Taipei (TW); Chi Ho Pun, Hong Kong (CN); Wai Yip Jacky Lai, Hong Kong (CN); Hon Chung Wong, Hong Kong (CN)

(73) Assignee: Yahoo! Inc., Sunnyvale, CA (US)

( * ) Notice: Subject to any disclaimer, the term of this patent is extended or adjusted under 35 U.S.C. 154(b) by 271 days.

(21) Appl. No.: 12/789,980

(22) Filed: May 28, 2010

(65) Prior Publication Data

US 2011/0295877 A1 Dec. 1, 2011

(51) Int. Cl.
*G06F 7/00* (2006.01)
*G06K 9/00* (2006.01)
*G06F 17/30* (2006.01)

(52) U.S. Cl.
CPC ...... *G06K 9/00402* (2013.01); *G06F 17/30967* (2013.01)
USPC .......................................... 707/736; 707/708

(58) Field of Classification Search
CPC ................ G06F 17/241; G06F 17/242; G06F 17/30722; G06F 17/30997
USPC ................................................. 707/708, 736
See application file for complete search history.

(56) References Cited

U.S. PATENT DOCUMENTS

| | | | |
|---|---|---|---|
| 5,926,566 | A | 7/1999 | Wang et al. |
| 2002/0152258 | A1* | 10/2002 | Zhou .............................. 709/201 |
| 2005/0152602 | A1 | 7/2005 | Chen et al. |
| 2007/0050186 | A1* | 3/2007 | Cheng ............................... 704/9 |
| 2008/0158201 | A1* | 7/2008 | Yoshida ......................... 345/179 |
| 2009/0204609 | A1 | 8/2009 | Labrou et al. |
| 2010/0005086 | A1* | 1/2010 | Wang et al. ....................... 707/5 |

FOREIGN PATENT DOCUMENTS

| | | |
|---|---|---|
| CN | 1187257 | 7/1998 |
| CN | 1896934 | 1/2007 |
| CN | 101714141 A | 5/2010 |
| CN | 1017141141 | 5/2010 |
| WO | WO 2010005798 | 1/2010 |

OTHER PUBLICATIONS

M. C. Ramsey, T. -H. Ong, H. Chen, "Multilingual Input System for the Web-An Open Multimedia Approach of Keyboard and Handwriting Recognition for Chinese and Japanese," adl, p. 188, Fifth International Forum on Research and Technology Advances in Digital Libraries (ADL '98), 1998.*

(Continued)

*Primary Examiner* — Cheyne D Ly
(74) *Attorney, Agent, or Firm* — James J. DeCarlo; Greenberg Traurig, LLP (57) ABSTRACT

A graphic representation resulting from a user interacting with a user interface operating on a user device is received over a network. The graphic representation corresponds to a portion of a desired graphic character of a graphic character set (e.g. Chinese). The graphic representation is analyzed to select a plurality of graphic characters of the graphic character set that are a probable match of the graphic representation. The plurality of probable graphic characters are transmitted back to the user. A selection of one of the plurality of probable graphic characters is received over the network. A plurality of suggested search terms are identified to the user. Each suggested search term comprises at least one graphic character from the graphic character set. One of the plurality of suggested search terms is selected to be used to conduct an Internet search. An Internet search is then conducted using the selected search term.

9 Claims, 8 Drawing Sheets

(56) References Cited

OTHER PUBLICATIONS

Naver Blog Posting ("Chinese Character Handwriting Recognizer Function," The Naver Online Chinese Dictionary, Jun. 12, 2009), 8 pages.

Y. Akiyima, Software Review Application Soft. Journal of Japan Association for East Asian Test Processing, Japan, Koubun Publisher Inc., Oct. 1, 2008; vol. 9. pp. 111-120.

* cited by examiner

SYSTEM AND METHOD FOR ONLINE HANDWRITING RECOGNITION IN WEB QUERIES

This application includes material which is subject to copyright protection. The copyright owner has no objection to the facsimile reproduction by anyone of the patent disclosure, as it appears in the Patent and Trademark Office files or records, but otherwise reserves all copyright rights whatsoever.

FIELD OF THE INVENTION

The present invention relates to systems and methods for interfaces for web queries, more particularly, to systems and methods for using online handwriting recognition to improve the ease of use of web query entry, particularly for graphic character sets.

BACKGROUND OF THE INVENTION

Web search services, such as those provided by Yahoo! and Google, are among the most popular and important applications available on the Internet. Access to the full array of content on the Internet is difficult, if not impossible, without the facilities provided by such services. The availability of the Internet has spread to many Asian countries such as, for example, China and Taiwan.

This presents a significant challenge. There is much content that is available in traditional Asian character sets, and searching such content requires the entry of such characters. Electronic devices, such as computers and mobile devices typically provide user interface elements based on the Roman characters. Asian characters can only be entered indirectly using an equivalent based on the Roman character set, such as Pinyin (Chinese), or some other complicated set of key entries. This can pose a barrier to the use of the Internet to large segments of Asian populations, such as the elderly, that are unfamiliar with the Roman alphabet or Asian character equivalent systems.

SUMMARY OF THE INVENTION

In one embodiment, the invention is a method. A graphic representation resulting from a user interacting with a user interface operating on a user device is received over a network. The graphic representation corresponds to a portion of a desired graphic character of a graphic character set (e.g. Chinese). The graphic representation is then analyzed, using a computing device, to select a plurality of graphic characters of the graphic character set that are a probable match of the graphic representation. The plurality of probable graphic characters are transmitted, over the network, to the user. A selection of one of the plurality of probable graphic characters is received over the network. An indication is received from the user, over the network, that the selected one of the plurality of probable graphic characters is to be used as a search term to conduct an internet search. An Internet search is then conducted using the search term.

In another embodiment, the invention is a method. A graphic representation resulting from a user interacting with a user interface operating on a user device is received over a network. The graphic representation corresponds to a portion of a desired graphic character of a graphic character set (e.g. Chinese). The graphic representation is then analyzed, using a computing device, to select a plurality of graphic characters of the graphic character set that are a probable match of the graphic representation. The plurality of probable graphic characters are transmitted, over the network, to the user. A selection of one of the plurality of probable graphic characters is received over the network. A plurality of suggested search terms are identified to the user. Each suggested search term comprises at least one graphic character from the graphic character set. One of the plurality of suggested search terms is selected to be used to conduct an Internet search. An Internet search is then conducted using the selected search term.

In another embodiment, the invention is a system. The system comprises one or more modules comprising one or more processors programmed to execute software code retrieved from a computer readable storage medium storing software for various functions. In one embodiment, the system comprises: a graphics receiving module for receiving, over a network, from users, data comprising graphic representations resulting from the users interacting with user interfaces operating on a user devices, the graphic representation corresponding to a portion of a desired graphic character of a graphic character set; a graphic character recognition module for analyzing graphic representations received by the graphics receiving module to select a plurality of graphic characters of the graphic character set that are probable matches of the graphic representations; a graphic character transmission module for transmitting, over the network, pluralities of probable graphic characters to users; a graphic character selection receiving module for receiving, over the network from an indication that the selected one of the plurality of probable graphic characters is to be used as a search term to conduct an internet search; a search indication receiving module for receiving, over the network, an indication that selected probable graphic characters are to be used as a search term to conduct an Internet search; a search term identification module for identifying to users a plurality of suggested search terms, each suggested search term comprising at least one graphic character from the graphic character set; a search term selection receiving module for receiving, over the network, from users, selections of suggested search terms to be used to conduct an Internet search; and a web search module for conducting Internet searches using selected search terms.

BRIEF DESCRIPTION OF THE DRAWINGS

The foregoing and other objects, features, and advantages of the invention will be apparent from the following more particular description of preferred embodiments as illustrated in the accompanying drawings, in which reference characters refer to the same parts throughout the various views. The drawings are not necessarily to scale, emphasis instead being placed upon illustrating principles of the invention.

DETAILED DESCRIPTION

The present invention is described below with reference to block diagrams and operational illustrations of methods and devices to select and present media related to a specific topic. It is understood that each block of the block diagrams or operational illustrations, and combinations of blocks in the block diagrams or operational illustrations, can be implemented by means of analog or digital hardware and computer program instructions.

These computer program instructions can be provided to a processor of a general purpose computer, special purpose computer, ASIC, or other programmable data processing apparatus, such that the instructions, which execute via the processor of the computer or other programmable data processing apparatus, implements the functions/acts specified in the block diagrams or operational block or blocks.

In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and applications software which support the services provided by the server.

For the purposes of this disclosure the term "end user" or "user" should be understood to refer to a consumer of data supplied by a data provider. By way of example, and not limitation, the term "end user" can refer to a person who receives data provided by the data provider over the Internet in a browser session, or can refer to an automated software application which receives the data and stores or processes the data.

For the purposes of this disclosure, a computer readable medium stores computer data in machine readable form. By way of example, and not limitation, a computer readable medium can comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid-state memory technology, CD-ROM, DVD, or other optical storage, magnetic cassettes, magnetic tape, magnetic disk storage or other mass storage devices, or any other medium which can be used to store the desired information and which can be accessed by the computer.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium. Modules may be integral to one or more servers, or be loaded and executed by one or more servers. One or more modules may grouped into an engine or an application.

The present invention is directed to systems and methods for improving the accessibility of web search services by integrating online recognition of handwritten characters and words into search query entry and search query assistance functions provided by such services. In one embodiment, online, real-time handwriting recognition functions are hosted on servers and are integrated into search query functions users through simple browser interfaces, thereby eliminating the need for complex, specialized software and hardware on end user devices.

Figure 1:
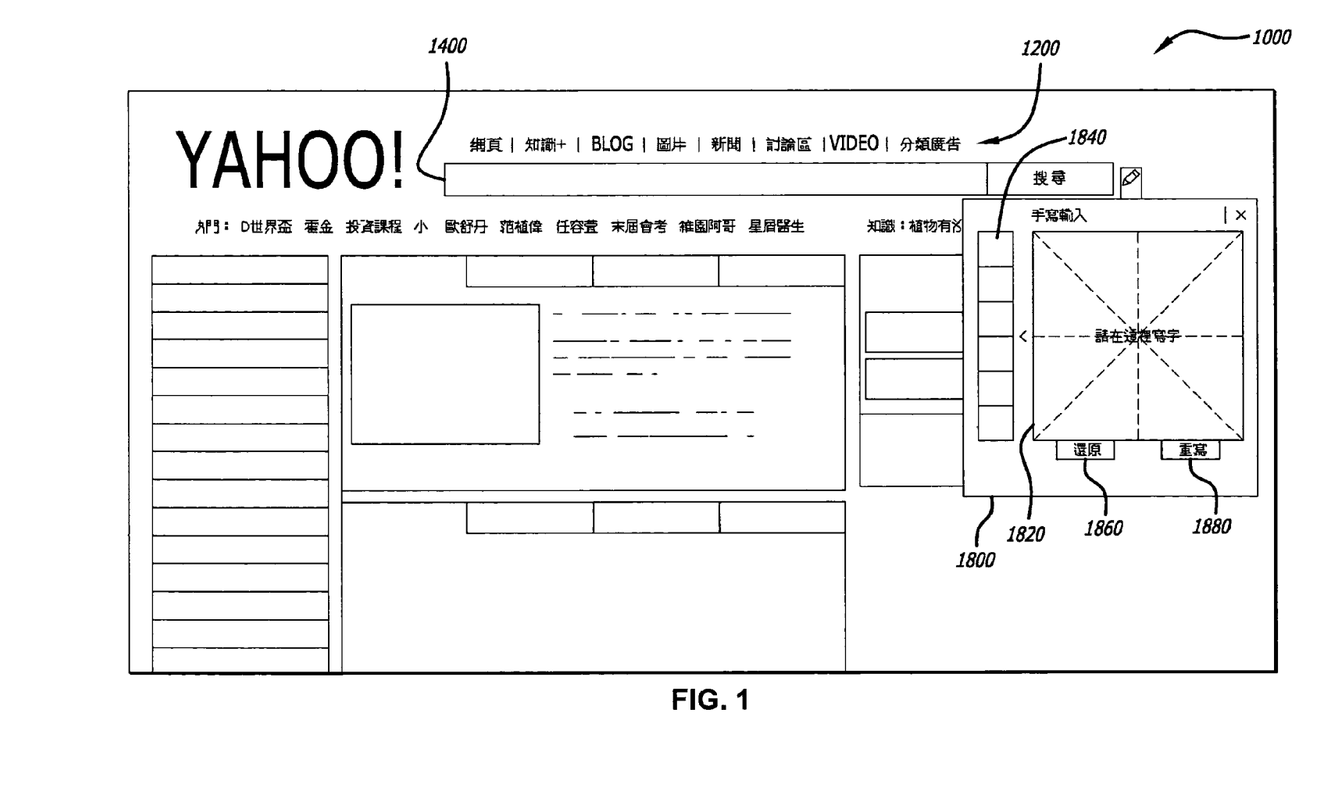
FIG. 1 presents a web query entry user interface providing online handwriting recognition prior to the entry of any characters.

FIG. 1-5 illustrates one embodiment of a web query entry user interface 1000 providing online handwriting recognition. FIG. 1 presents a web query entry user interface 1000 prior to the entry of any characters comprising a web query. The interface provides a menu bar 1200 that enables users to select various functions, such as, for example, search functions. The interface provides a web query entry element 1400 in which a user can enter web queries. A query entered in the box 1400 can be submitted to a search engine by clicking a submit button 1440. The interface further provides a handwriting recognition element 1800 having, inter alia, a drawing area 1820 for drawing graphic characters. The handwriting recognition element 1800 can be automatically displayed when the web query entry user interface 1000 is displayed, or can be displayed in response to any user interface action such as, for example, a combination of keys or the selection of a menu option.

Figure 2:
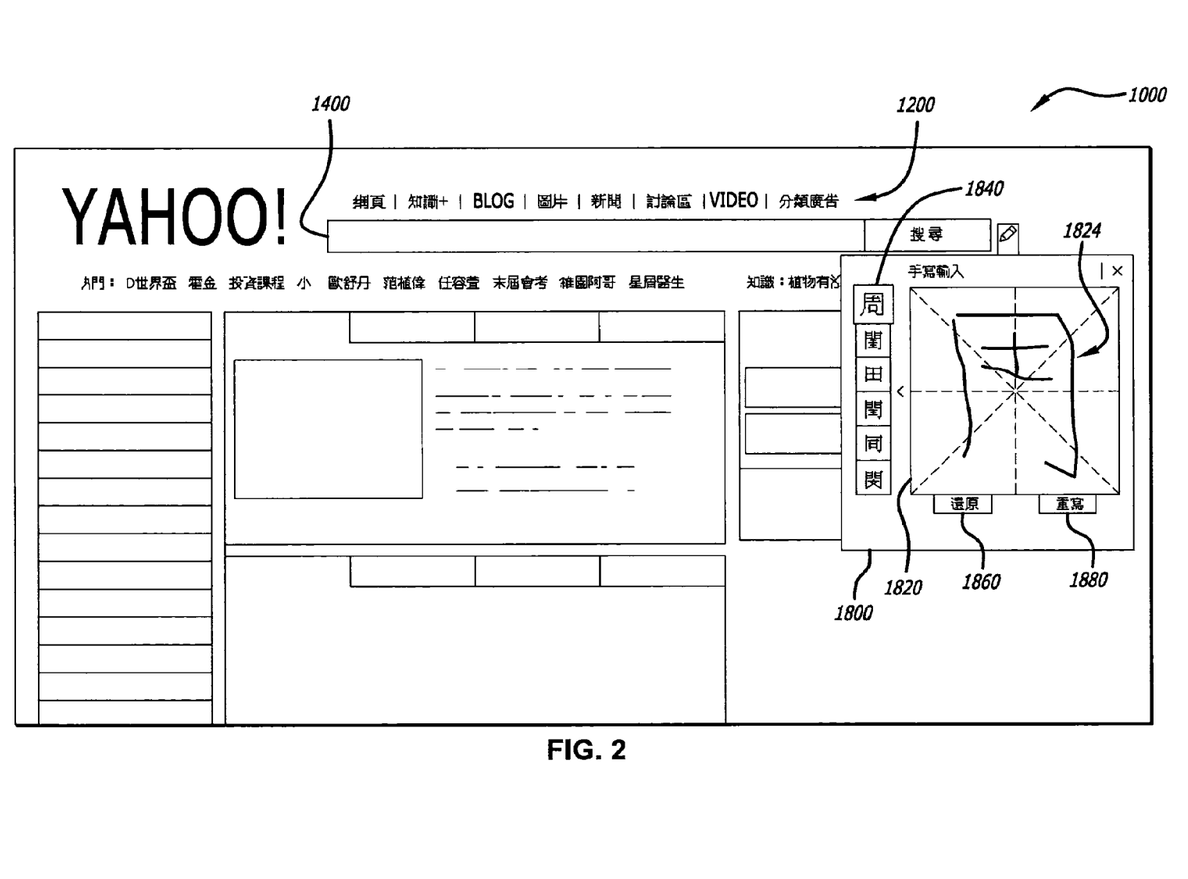
FIG. 2 presents the web query entry user interface of FIG. 1 after a user has begun entry of a graphic character.

FIG. 2 presents the web query entry user interface 1000 of FIG. 1 after a user has begun entry of a graphic character. The user can draw strokes 1824 in the drawing area 1820 using user interface actions such as, for example, moving the mouse in the drawing area while depressing a mouse button. The interface can provide undo 1860 and redo 1880 buttons that enable the user to undo and redo the drawing of stokes 1824 in the drawing area 1820. As the user draws each stroke 1824, a selection of graphic characters 1840 that most closely approximate the strokes are displayed 1840. In one embodiment, the characters 1840 are selected using handwriting recognition technology or other pattern matching technology. In the illustrated embodiment, the interface displays five suggested characters 1840, but fewer or more could be displayed. In one embodiment, a new selection of characters 1840 is displayed every time a user enters a stroke 1824 or selects the undo 1860 or redo 1880 buttons. When the intended character is displayed, the user can select one of the characters 1840 by a user interface action such as, for example, clicking or double clicking on the intended character.

Figure 3:
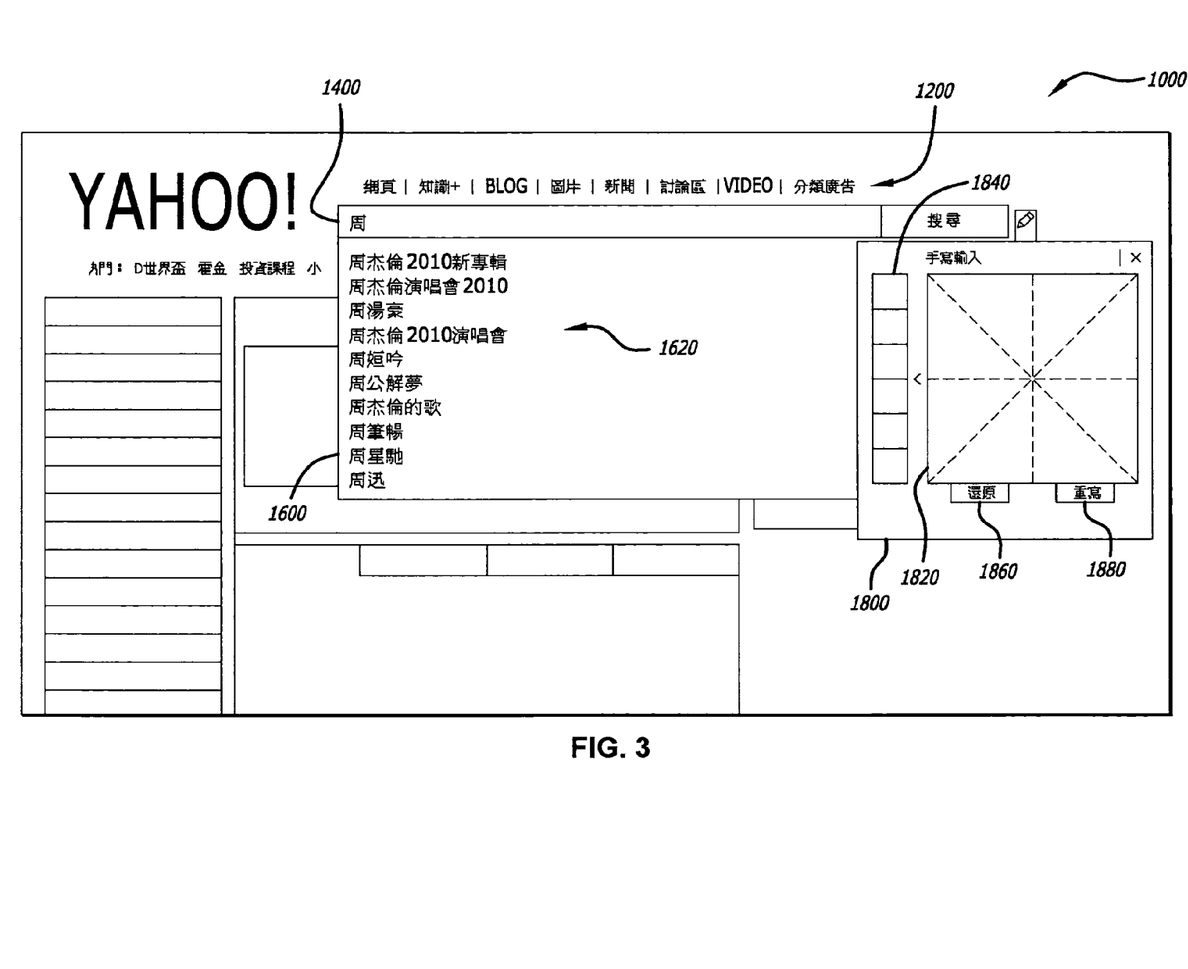
FIG. 3 presents the web query entry user interface of FIG. 2 after a user has selected a first graphic character.

FIG. 2 presents the web query entry user interface 1000 of FIG. 1 after a user has selected a first graphic character. The selected graphic character is placed in the query entry text box 1400 and the drawing area 1820 is cleared. In one embodiment, the interface further provides a search assist function. The selected character is used to suggest a number of search terms comprising one or more characters. Suggested search terms can be presented in a drop down list 1600 comprising one or more suggested search terms. In one embodiment, the user could select one of the search terms using a user interface action such as, for example, clicking on a search term 1620. Such a selection can then automatically submit the suggested search term to a search engine. Alternatively, the user could select a query submission button 1440 to submit the query in the query entry box 1400 to a search engine.

Figure 4:
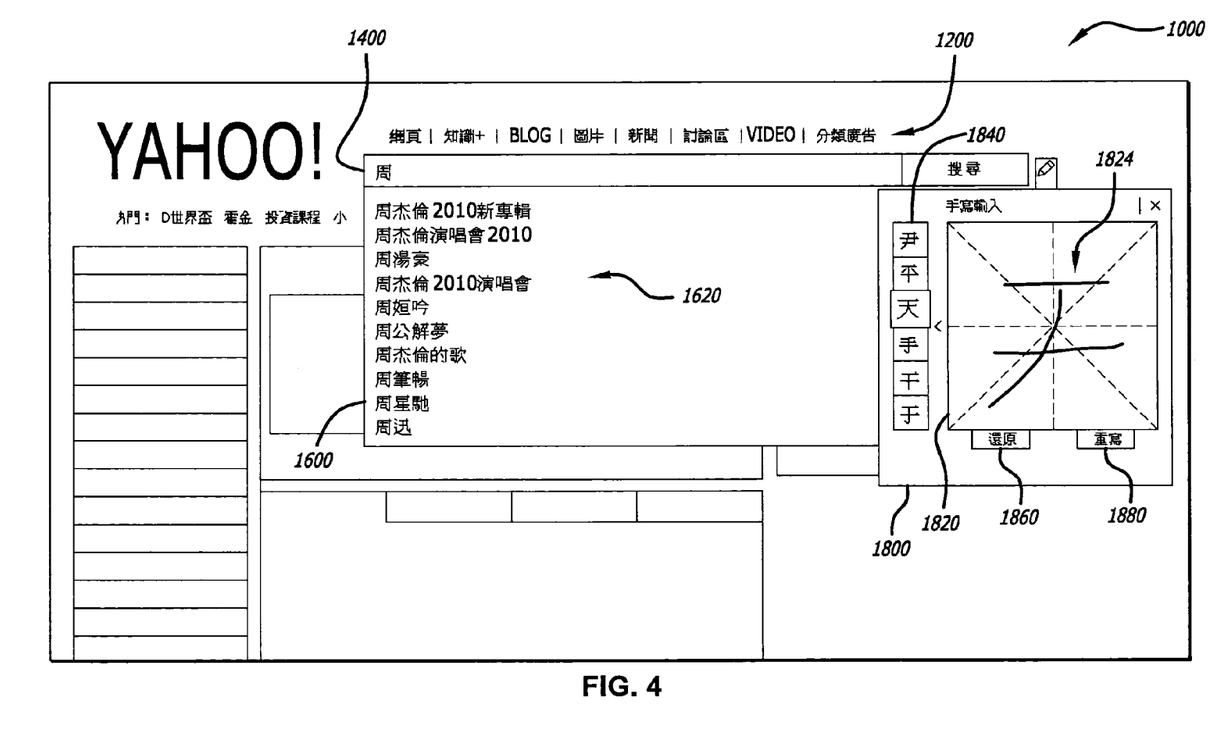
FIG. 4 presents the web query entry user interface of FIG. 3 after a user has begun entry of a second graphic character.
Figure 5:
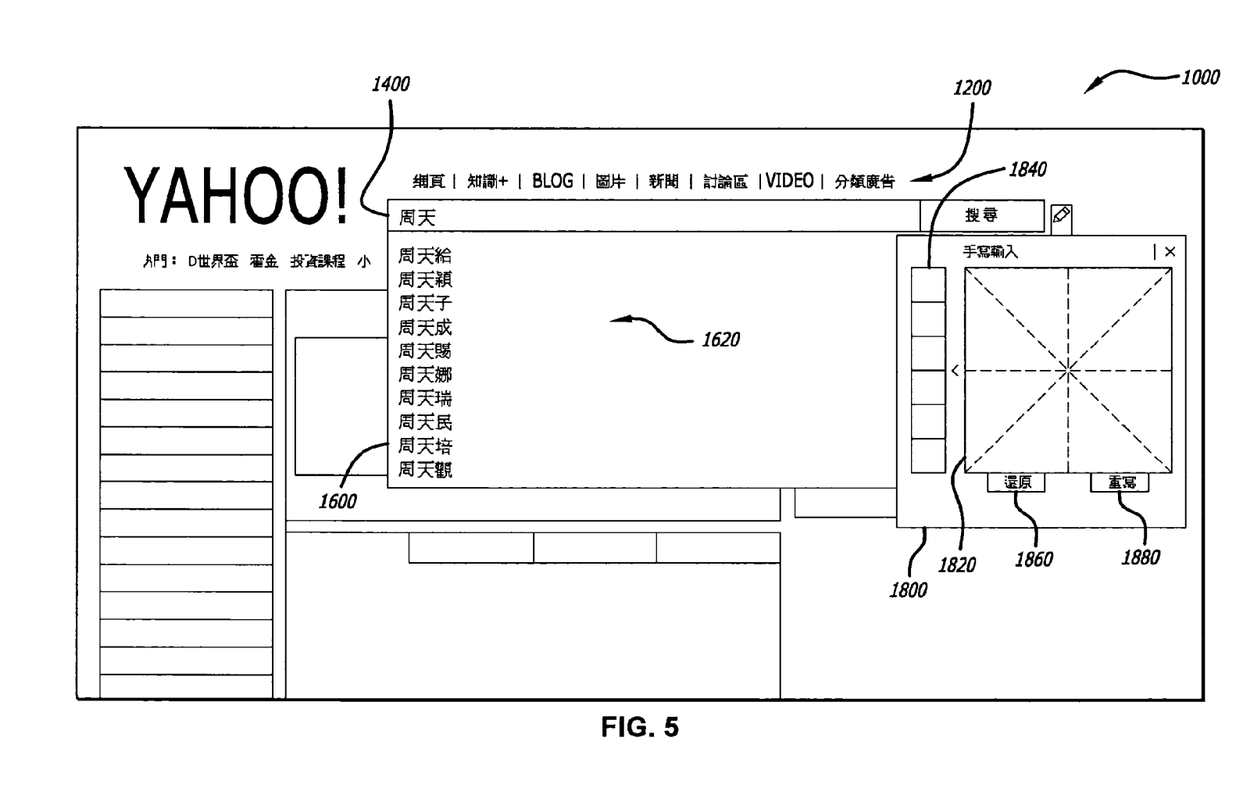
FIG. 5 presents the web query entry user interface of FIG. 4 after a user has selected a second graphic character.

If the user does not wish to submit the entered character or a suggested search term to a search engine, the user may continue to enter graphic characters. FIG. 4 presents the web query entry user interface 1000 of FIG. 3 after a user has begun entry of a second graphic character. The first selected character remains in the query entry box 1400 and the suggested search terms 1620 remain the same. The strokes 1824 drawn by the user are used to select a second set of suggested characters 1840. The user can select one of the suggested characters for addition to the query in the query entry box. FIG. 5 presents the web query entry user interface 1000 of FIG. 4 after a user has selected a second graphic character. The selected graphic character is added to the first character in the query entry text box 1400 and the drawing area 1820 is cleared. The selected characters are used to suggest a number of search terms comprising one or more characters 1600 comprising one or more suggested search terms.

In one embodiment, the user can continue to enter any number of characters until the user is satisfied the query in the query entry box 1400 or a suggested search term 1620 properly expresses the user's intent. In the event the characters in the query entry box 1400 express the user's intent, the user can submit the query by selecting the query submission button. In the event a selected search term 1620 express the user's intent, the user can select the term, which can then be automatically submitted to a search engine. While the examples provided in FIG. 1-5 illustrate an interface enabling the entry of Chinese characters, it is understood that the interface could enable the entry of characters from any graphic character set, including, for example Latin, Cyrillic, Arabic, Japanese or other character sets.

Figure 6:
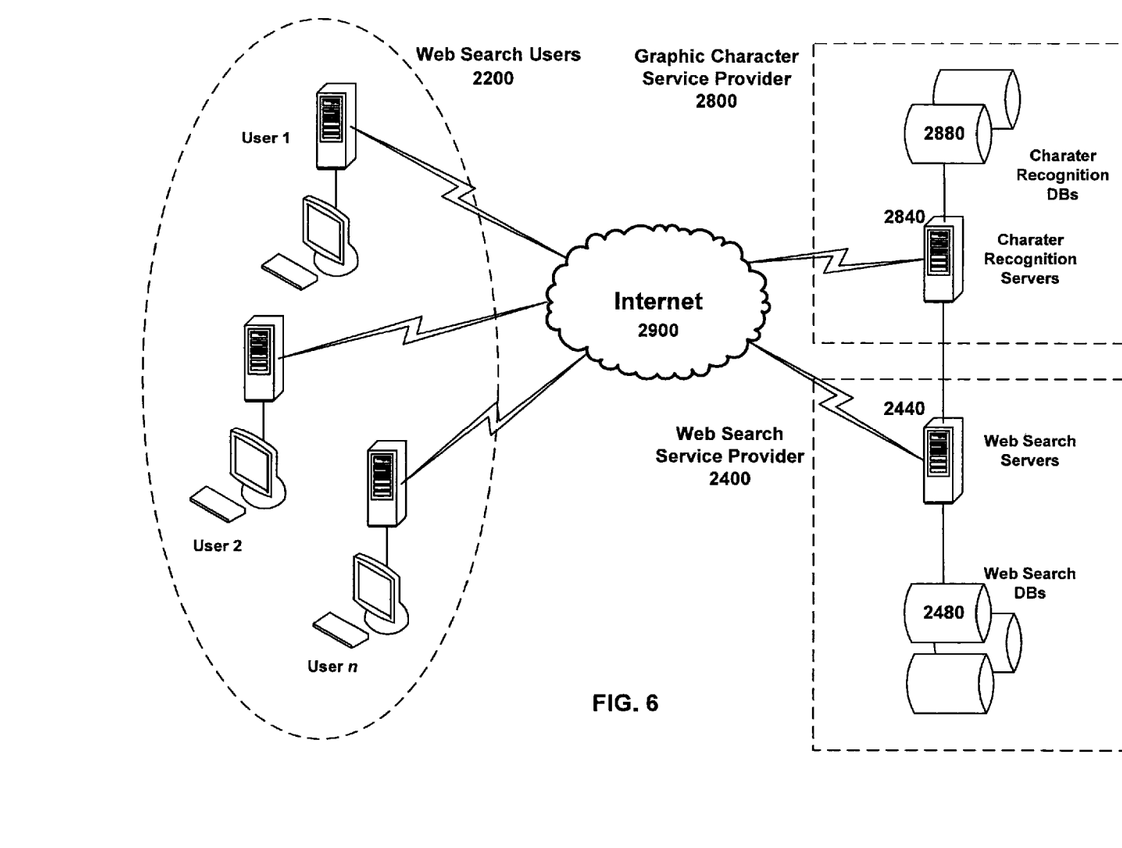
FIG. 6 illustrates a high-level view of a system capable of supporting web query services with online handwriting recognition.

FIG. 6 illustrates a high-level view of a system 2000 capable of supporting web query services with online handwriting recognition. A plurality of users 2200 access, inter alia, web search services over the Internet 2900. Web search services are provided by web search service providers 2400 such as Yahoo! or Google. In one embodiment, web search service providers 2400 maintain one or more web search servers 2440 and web search databases 2480, such as, for example, indexes of web sites and/or documents or other objects accessible over the Internet.

Web search service providers 2400 can provide one or more user interfaces enabling users 2200 to enter web search queries. Such interfaces may include online graphic character (e.g. handwriting) recognition. Online graphic character recognition can be provided by the web search service provider, or, alternatively, online graphic character recognition services may be provided by a character recognition services provider 2800. In one embodiment, online graphic character recognition providers 2800 maintain one or more character recognition servers 2840 and character recognition databases 2880, such as, for example, databases supporting the recognition of characters from Asian character sets.

The system shown in FIG. 6 is purely illustrative. Those skilled in the art will appreciate that the functions provided by the system in FIG. 6 could be provided by a number of alternate configurations. For example, web search functions and online character recognition services could be provided by a single service provider and be implemented on a single server. Alternatively, web search functions and online character recognition services could be divided between multiple servers and/or service providers.

Figure 7:
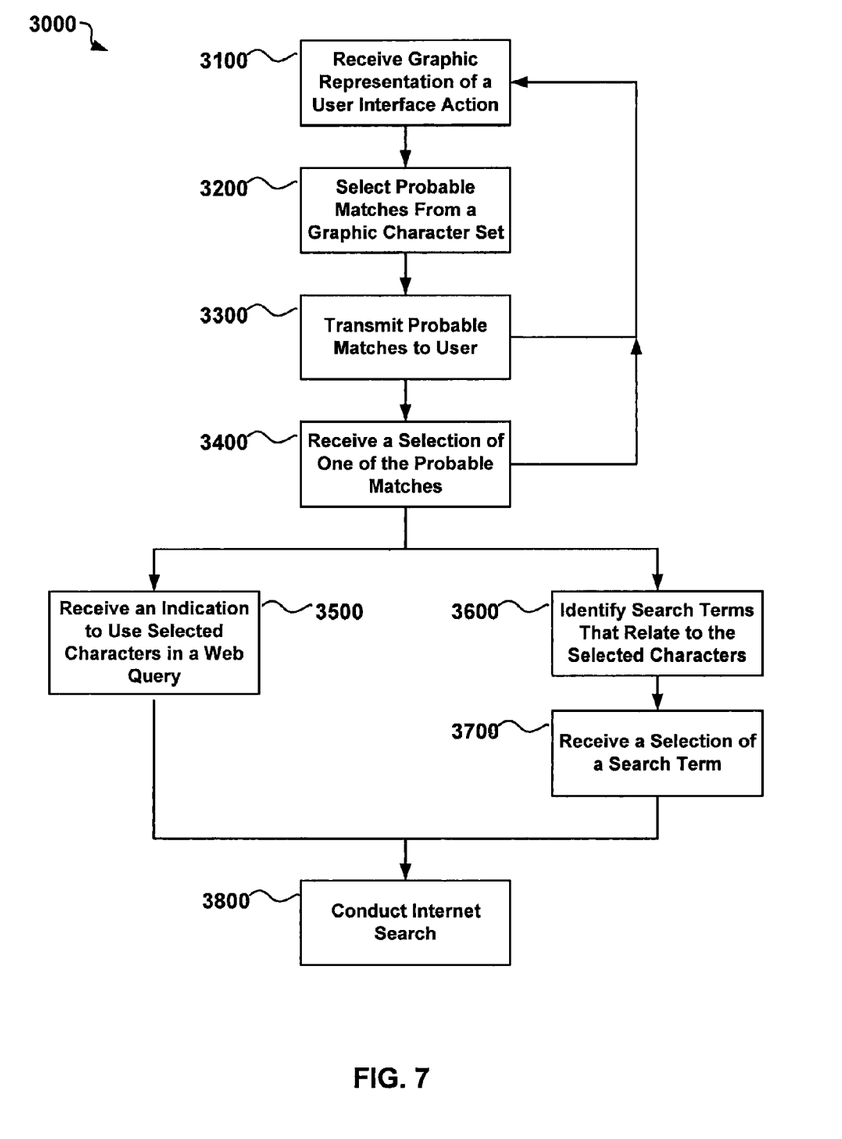
FIG. 7 illustrates one embodiment of a method for providing web search services that includes online character recognition.

FIG. 7 illustrates one embodiment of a method 3000 for providing web search services that includes online character recognition. Data comprising a graphic representation resulting from the user interacting with a user interface operating on a user device is received 3100. The graphic representation corresponds to a portion of a desired graphic character of a graphic character set. The graphic character set could be any currently known, or invented in the future. The present system and method is particularly useful with respect to Asian character sets, such as Chinese, where relatively complex character sets have individual characters representing words, but the system and method could be adapted to any character set such as, for example Latin, Cyrillic, Arabic, Japanese or other character sets.

The user interface action could be any user interface action that is capable of generating all, or a portion, of a graphic character. In the embodiment illustrated in FIG. 1-5, elements of a Chinese character are drawn using strokes produced by, for example, moving a mouse while holding down a mouse button or a keyboard key. The interface could provide other means by which a graphic character is drawn, as will be readily apparent to those skilled in the art, and such means are within the scope of the invention disclosed herein.

As each graphic representation is received, the system analyzes the graphic representation 3200, using at least one computing device, to select a plurality of graphic characters of a graphic character set that are a probable match of the graphic representation. In one embodiment, the analysis 3100 and analysis functions 3200 could be repeated for a plurality of repetitions, allowing a user to build a complex representation of a character comprising multiple elements (e.g. multiple strokes). In one embodiment, each time an element of a graphic character is defined by a user interface action, the character defined by the set of all interface actions is analyzed.

In alternative embodiments, the system could allow a user to enter multiple graphic representations before analyzing the graphic representations. In one embodiment, the analysis of the graphic representation could occur automatically after every user interface interaction (e.g. after every stroke). In one embodiment, the analysis of the graphic representation could be initiated by selection of an analysis function (e.g. an "analyze" button after multiple strokes of a graphic character are entered.)

The number of probable matches could vary based on the analysis of the graphic representations received. The illustrated embodiments in FIG. 1-5 show five probable matches, but the number could be larger or smaller. If a user enters a representation of a character that is very precise the number of probable matches could be one. If the user's entry is incomprehensible, the number could be zero. Alternatively, the number of matches could be large, for example, one hundred or greater. The analysis of the graphic representations could be performed by a web search service, or could, alternatively, be performed by a graphic character recognition service.

The plurality of probable graphic characters is then transmitted to the user 3300. In one embodiment, the probable matches are displayed to the user by a user interface. The number of probable matches displayed to a user can vary depending on user interface design. In one embodiment, the user interface displayed to users allows the user to select one of the plurality of graphic characters for use in an Internet query.

A selection of one of the plurality of probable graphic character matches is then received 3400 from the user. The selection can be received after a first set of probable matches is transmitted to the user, or it can be received after multiple sets of probable matches are transmitted to the user in response to multiple user interface actions defining, for example, a complex graphic character. Furthermore, the user may choose to enter and select a plurality of characters, repeating the step 3100 through 3400 described above, thereby building a web query consisting of multiple characters.

In one embodiment, an indication is then received 3500 that the selected probable graphic characters are to be used as a search term to conduct an Internet search. In one embodiment, such an indication could be received after a user selects a "Search" button on a user interface, indicating the user wishes to conduct an Internet search using the selected graphic characters. An Internet search is then conducted 3800 using the selected term.

Alternatively or additionally, the selected character or characters can used to identify 3600 one or more suggested search terms. In one embodiment, existing search assistance functions provided by commercial web search functions, such as those provided by Yahoo! or Google could be used. Such search assistance functions, in one embodiment, match search queries to list of a users' probable intent. Such suggested search terms can then be transmitted to the user. When one of the selected search terms is selected by the user 3700, the selected search term is then used to conduct an Internet search.

Figure 8:
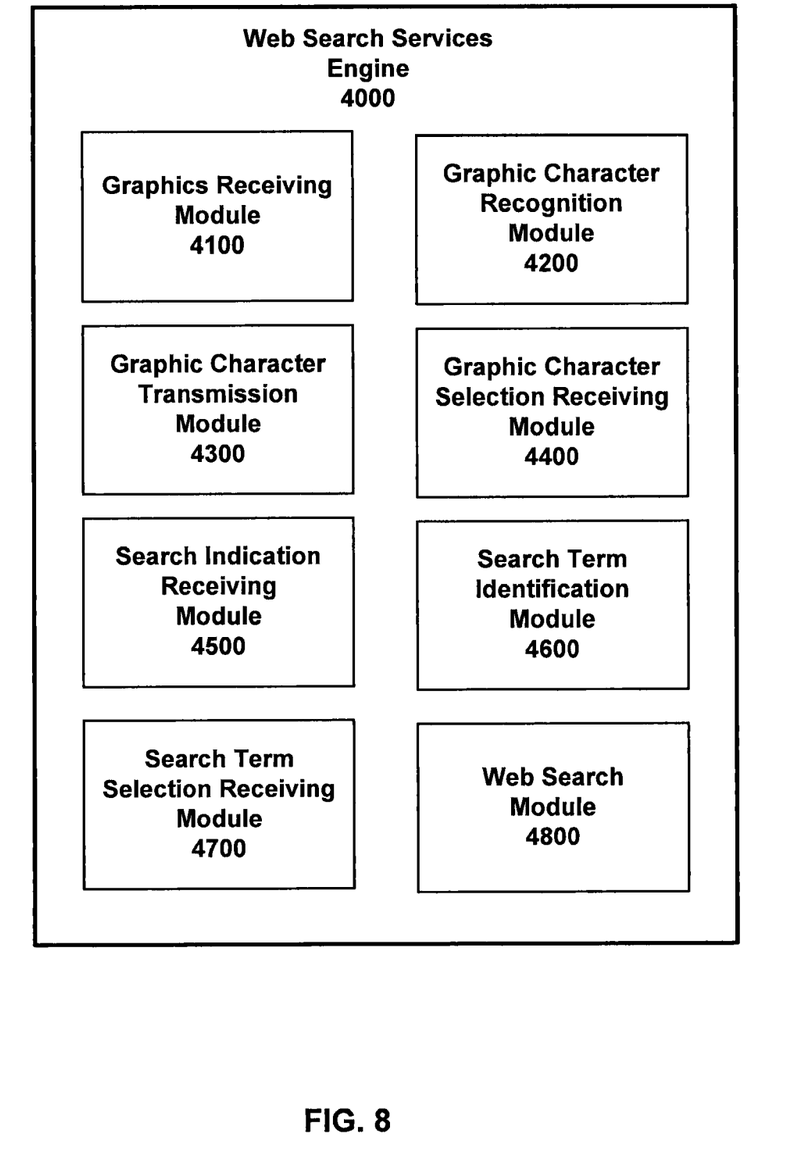
FIG. 8 illustrates one embodiment of web search services engine capable of supporting at least one embodiment of the process shown in FIG. 7.

FIG. 8 illustrates one embodiment of web search services engine 4000 capable of supporting at least one embodiment of the process shown in FIG. 7. The web search services search engine comprises one or more modules. Each module comprises one or more processors programmed to execute software code retrieved from a computer readable storage medium storing software for performing various functions. In one embodiment, the web search services engine 4000 comprises a graphics receiving module 4100, a graphic character recognition module 4200, a graphic character transmission module 4300, a graphic character selection receiving module 4400, a search indication receiving module 4500, a search term identification module 4600, a search term selection receiving module 4700 and a web search module 4800.

Each of the modules could be implement on one or more servers. For example, the graphics receiving module 4100, the graphic character transmission module 4300, the graphic character selection receiving module 4400, a search indication receiving module 4500, the search term identification module 4600, the search term selection receiving module 4700 and the web search module 4800 could be implemented on one or more web search services servers such as shown in 2480 of FIG. 6, and the graphic character recognition module 4200, could be implemented on one or more character recognition servers such as that shown in 2840 of FIG. 6. Other configurations are possible, as will be readily apparent to those skilled in the art.

In one embodiment, the graphics receiving module 4100 is configured to receive data comprising graphic representations resulting from users interacting with a user interface operating on a user device. The graphic representation corresponds to a portion of a desired graphic character of a graphic character set. The graphic character set could be any currently known, or invented in the future. The user interface action could be any user interface action that is capable of generating all, or a portion, of a graphic character. In the embodiment illustrated in FIG. 1-5, elements of a Chinese character are drawn using strokes produced by, for example, moving a mouse while holding down a mouse button or a keyboard key. The interface could provide other means by which a graphic character is drawn, as will be readily apparent to those skilled in the art, and such means are within the scope of the invention disclosed herein.

In one embodiment, the graphic character recognition module 4200, is configured to analyze graphic representations received by the graphics receiving module to select a plurality graphic characters from a graphic character set that are probable matches of the graphic representations received by the module. The number of probable matches could vary based on the analysis of the graphic representations received. The illustrated embodiments in FIG. 1-5 show five probable matches, but the number could be larger or smaller. If a user enters a representation of a character that is very precise the number of probable matches could be one. If the user's entry is incomprehensible, the number could be zero. Alternatively, the number of matches could be large, for example, one hundred or greater.

In one embodiment, the graphic character transmission module 4300 transmits graphic characters from a graphic character set that are probable matches of the graphic representations selected by the graphic character recognition module 4200 to users. In one embodiment, the probable matches are displayed to the user by a user interface. The number of probable matches displayed to a user can vary depending on user interface design. In one embodiment, the user interface displayed to users allows the user to select one of the plurality of graphic characters for use in an Internet query.

In one embodiment, the graphic character selection receiving module 4400 is configured to receive selections of probable graphic character matches transmitted by the graphic character transmission module 4300. Such selections can be received after a first set of probable matches is transmitted to the user, or it can be received after multiple sets of probable matches are transmitted to the user in response to multiple user interface actions defining, for example, a complex graphic character. Furthermore, the user may choose to enter and select a plurality of characters.

In one embodiment, the search indication receiving module 4500 is configured to receive indications that selected probable graphic characters are to be used as search terms to conduct Internet searches. In one embodiment, such indications could be received after a user selects a "Search" button on a user interface, indicating the user wishes to conduct an Internet search using the selected graphic characters. Such searches are conducted, in one embodiment, using the web search module 4800.

In one embodiment, the search term identification module 4600 is configured to use the characters selected by the graphic character selection receiving module to identify suggested search terms. In one embodiment, existing search assistance functions provided by commercial web search functions, such as those provided by Yahoo! or Google could be used. Such search assistance functions, in one embodiment, match search queries to list of a users' probable intent. Such suggested search terms can then be transmitted to the user.

In one embodiment, the search term selection receiving module 4700 receives selected search terms from users and user selected search terms to conduct Internet searches. Such searches are conducted, in one embodiment, using the web search module 4800.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

We claim:

1. A method comprising:
    receiving, over a network, from a user, handwritten user input data comprising a graphic representation, the graphic representation corresponding to a portion of a user desired graphic character of a graphic character set;
    analyzing, by at least one computing device, the graphic representation comprising the portion of the user desired graphic character;
    selecting, by the at least one computing device, prior to the user completing entry of the user desired graphic character, a plurality of graphic characters of the graphic character set that are a probable match of the graphic representation;
    transmitting, over the network by the at least one computing device, the plurality of probable graphic characters to the user;
    receiving, over the network by the at least one computing device, from the user a selection of one of the plurality of probable graphic characters;
    transmitting, over the network by the at least one computing device, to the user, a plurality of suggested search terms, each suggested search term comprising at least the selected graphic character from the graphic character set;
    receiving, over the network by the at least one computing device, from the user, an indication that one of the plurality of suggested search terms is to be used as a search term to conduct an Internet search;
    conducting, by the at least one computing device an Internet search using the indicated search term;
    wherein the steps of receiving a graphic representation, analyzing the graphic representation, selecting and transmitting the plurality of probable graphic characters are iteratively repeated for a plurality of repetitions by the computing device as further portions of the user desired graphic character are entered, until the selection of one of the plurality of graphic characters is received.

2. The method of claim 1 wherein the graphic character set comprises a set of characters selected from an Asian language.

3. The method of claim 2 wherein the Asian language is Chinese.

4. A method comprising:
    receiving, over a network by at least one computing device, from a user, handwritten user input data comprising a graphic representation, the graphic representation corresponding to a portion of a user desired graphic character of a graphic character set;
    analyzing, by the at least one computing device, the graphic representation comprising the portion of the user desired graphic character;
    selecting, by the at least one computing device, prior to the user completing entry of the user desired graphic character, a plurality of graphic characters of the graphic character set that are a probable match of the graphic representation;
    transmitting, over the network by the at least one computing device, the plurality of probable graphic characters to the user;
    receiving, over the network by the at least one computing device, from the user a selection of one of the plurality of probable graphic characters;
    identifying, by the at least one computing device, to the user a plurality of suggested search terms, each suggested search term comprising at least the selected graphic character from the graphic character set;
    receiving, over the network by the at least one computing device, from the user a selection of one of the plurality of suggested search terms to be used to conduct an Internet search;
    conducting, by the at least one computing device an Internet search using the search term;
    wherein the steps of receiving a graphic character, analyzing the graphic representation, selecting and transmitting the plurality of probable graphic characters as further portions of the user desired graphic character are entered and receiving a selection are iteratively repeated for a plurality of repetitions by the computing device until the selection of one of the plurality of suggested search terms.

5. A non-transitory computer-readable medium having computer-executable instructions which when executed by a computing device, cause the device to execute a method comprising:
    receiving, over a network, from a user, handwritten user input data comprising a graphic representation, the graphic representation corresponding to a portion of a user desired graphic character of a graphic character set;
    analyzing, the graphic representation comprising the portion of the user desired graphic character;
    selecting, prior to the user completing entry of the user desired graphic character, a plurality of graphic characters of the graphic character set that are a probable match of the graphic representation;
    transmitting, over the network, the plurality of probable graphic characters to the user;
    receiving, over the network, from the user a selection of one of the plurality of probable graphic characters;
    transmitting, over the network to the user, a plurality of suggested search terms, each suggested search term comprising at least the selected graphic character from the graphic character set;

receiving, over the network, from the user, an indication that one of the plurality of search terms is to be used as a search term to conduct an Internet search;

conducting an Internet search using the indicated search term;

wherein the steps of receiving a graphic representation, analyzing the graphic representation, selecting and transmitting the plurality of probable graphic characters are iteratively repeated for a plurality of repetitions by the computing device as further portions of the user desired graphic character are entered, until the selection of one of the plurality of graphic characters is received.

6. A non-transitory computer-readable medium having computer-executable instructions for a method comprising:

receiving, over a network, from a user, handwritten user input data comprising a graphic representation, the graphic representation corresponding to a portion of a desired graphic character of a graphic character set;

analyzing, by at least one computing device, the graphic representation comprising the portion of the user desired graphic character;

selecting, prior to the user completing entry of the user desired graphic character, a plurality of graphic characters of the graphic character set that are a probable match of the graphic representation;

transmitting, over the network, the plurality of probable graphic characters to the user;

receiving, over the network from the user a selection of one of the plurality of probable graphic characters;

identifying to the user a plurality of suggested search terms, each suggested search term comprising at least the selected graphic character from the graphic character set;

receiving, over the network, from the user a selection of one of the plurality of suggested search terms to be used to conduct an Internet search;

conducting an Internet search using the selected search term;

wherein the steps of receiving a graphic character, analyzing the graphic representation, selecting and transmitting the plurality of probable graphic characters as further portions of the user desired graphic character are entered and receiving a selection are iteratively repeated for a plurality of repetitions by the computing device until a selection of one of the plurality of suggested search terms.

7. A system comprising:

a graphics receiving module comprising one or more processors programmed to execute software code retrieved from a computer readable storage medium storing software for iteratively receiving, over a network, from a user, handwritten user input data comprising graphic representation, the graphic representation corresponding to a portion of a user desired graphic character of a graphic character set being input by the user;

a graphic character recognition module comprising one or more processors programmed to execute software code retrieved from a computer readable storage medium storing software for iteratively analyzing graphic representations received by the graphics receiving module as further portions of the user desired graphic character are entered by the user to select, prior to the user completing entry of the user desired graphic character, a plurality of graphic characters of the graphic character set that are probable matches of the graphic representations;

a graphic character transmission module comprising one or more processors programmed to execute software code retrieved from a computer readable storage medium storing software for transmitting iteratively, over the network, pluralities of probable graphic characters to users;

a graphic character selection receiving module comprising one or more processors programmed to execute software code retrieved from a computer readable storage medium storing software for receiving, over the network from an indication that the selected one of the plurality of probable graphic characters is to be used as a search term to conduct an internet search;

a search indication receiving module comprising one or more processors programmed to execute software code retrieved from a computer readable storage medium storing software for receiving, over the network, an indication that selected probable graphic characters are to be used as a search term to conduct an Internet search;

a search term identification module comprising one or more processors programmed to execute software code retrieved from a computer readable storage medium storing software for identifying to the user a plurality of suggested search terms, each suggested search term comprising at least the selected one of the plurality of probable graphic characters;

a search term selection receiving module comprising one or more processors programmed to execute software code retrieved from a computer readable storage medium storing software for receiving, over the network, from users, selections of suggested search terms to be used to conduct an Internet search; and a web search module comprising one or more processors programmed to execute software code retrieved from a computer readable storage medium storing software for conducting Internet searches using selected search terms.

8. The method of claim 1, further comprising:

providing, by the at least one computing device, an undo button that facilitates the user to undo a stroke.

9. The method of claim 1, further comprising:

providing, by the at least one computing device, a redo button that facilitates the user to redo a stroke.

* * * * *